US012038106B2

(12) United States Patent
Lawrence et al.

(10) Patent No.: US 12,038,106 B2
(45) Date of Patent: *Jul. 16, 2024

(54) PIPING CONNECTIONS AND CONNECTION SOCKETS

(71) Applicant: NIBCO Inc., Elkhart, IN (US)

(72) Inventors: Benjamin L. Lawrence, Elkhart, IN (US); David A. Bobo, Granger, IN (US); Christopher W. Mason, Granger, IN (US); Ronald Dale Paige, Granger, IN (US); Richard D. Latham, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,905

(22) Filed: May 25, 2023

(65) Prior Publication Data

US 2023/0296196 A1    Sep. 21, 2023

Related U.S. Application Data

(63) Continuation of application No. 17/087,020, filed on Nov. 2, 2020, now Pat. No. 11,708,922, which is a
(Continued)

(51) Int. Cl.
*F16L 13/14* (2006.01)
*F16L 21/03* (2006.01)
*F16L 37/092* (2006.01)

(52) U.S. Cl.
CPC ............ *F16L 13/142* (2013.01); *F16L 21/03* (2013.01); *F16L 37/0925* (2013.01)

(58) Field of Classification Search
CPC ....... F16L 13/142; F16L 21/03; F16L 37/091; F16L 37/0925
(Continued)

(56) References Cited

U.S. PATENT DOCUMENTS 693,830 A    2/1902    Burke
796,580 A    8/1905    Johnston
(Continued)

FOREIGN PATENT DOCUMENTS

GB    511527    8/1939
JP    56009025    1/1981
(Continued)

OTHER PUBLICATIONS

International Searching Authority, Search Report and Written Opinion for PCT/US2016/058150, Feb. 9, 2017, 7 pages, Russia.
(Continued)

*Primary Examiner* — Zachary T Dragicevich
(74) *Attorney, Agent, or Firm* — PRICE HENEVELD LLP

(57) ABSTRACT

A connection socket for a tubular connection includes a socket cup having a metal alloy composition and a sealing portion. A primary seal is positioned within the sealing portion. The primary seal includes an elastomeric material having a service temperature. One or more spacer rings are positioned within the sealing portion. A secondary seal is positioned within the sealing portion. The secondary seal includes a metal composition, wherein the secondary seal has a melting temperature at or above the service temperature of the primary seal. One or more locking rings are positioned within the sealing portion, wherein each of the one or more locking rings comprises a biting feature defined along an internal circumference of the locking ring.

20 Claims, 8 Drawing Sheets

Related U.S. Application Data continuation of application No. 15/670,239, filed on Aug. 7, 2017, now Pat. No. 10,823,316.

(60) Provisional application No. 62/534,324, filed on Jul. 19, 2017, provisional application No. 62/491,854, filed on Apr. 28, 2017.

(58) Field of Classification Search
USPC .............................. 285/340, 351, 382, 382.2
See application file for complete search history.

(56) References Cited

U.S. PATENT DOCUMENTS

| | | |
|---|---|---|
| 1,801,171 A | 4/1931 | Mueller |
| 2,201,372 A | 5/1940 | Miller |
| 2,438,529 A | 3/1948 | Woodling |
| 2,829,909 A | 4/1958 | Magnani |
| 2,914,347 A | 11/1959 | Magnani |
| 3,149,861 A | 9/1964 | Larsson |
| 3,244,441 A | 4/1966 | Caudle |
| 3,477,750 A | 11/1969 | Powell |
| 3,596,939 A | 8/1971 | Gibson |
| 3,600,010 A | 8/1971 | Downs |
| 3,632,141 A | 1/1972 | Larsson |
| 3,675,949 A | 7/1972 | Dawson |
| 3,960,394 A | 6/1976 | Hubner |
| 4,018,462 A | 4/1977 | Saka |
| 4,130,302 A | 12/1978 | Mitchell |
| 4,150,466 A | 4/1979 | Horvath |
| 4,249,340 A | 2/1981 | Maes, Jr. |
| 4,277,091 A | 7/1981 | Hunter |
| 4,328,982 A | 5/1982 | Christianson |
| 4,647,080 A | 3/1987 | Sandt |
| 4,850,096 A | 7/1989 | Gotoh |
| 4,880,260 A | 11/1989 | Gotoh |
| 4,964,657 A | 10/1990 | Gonzales |
| 5,007,667 A | 4/1991 | Unewisse |
| 5,080,406 A | 1/1992 | Hyatt |
| 5,108,134 A | 4/1992 | Irwin |
| 5,150,519 A | 9/1992 | Unewisse |
| 5,484,174 A | 1/1996 | Gotoh |
| 5,590,914 A | 1/1997 | Platner |
| 5,607,193 A | 3/1997 | Guest |
| 5,685,577 A | 11/1997 | Vanesky |
| 5,722,702 A | 3/1998 | Washburn |
| 5,845,945 A | 12/1998 | Carstensen |
| 5,918,914 A | 7/1999 | Morris |
| 6,059,338 A | 5/2000 | Diederichs |
| 6,131,956 A | 10/2000 | Foering |
| 6,224,114 B1 | 5/2001 | Franzen |
| 6,241,290 B1 | 6/2001 | Foering |
| 6,409,175 B1 | 6/2002 | Evans |
| 6,581,983 B1 | 6/2003 | Viegener |
| 6,619,701 B1 | 9/2003 | Udhofer |
| 6,695,012 B1 | 2/2004 | Ring |
| 6,805,385 B2 | 10/2004 | Viegener |
| 6,874,823 B2 | 4/2005 | Viegener |
| 6,976,712 B2 | 12/2005 | Lukach, Jr. |
| 7,201,382 B2 | 4/2007 | Viegener |
| 7,316,429 B2 | 1/2008 | Viegener |
| 7,658,419 B2 | 2/2010 | Viegener |
| 7,954,861 B2 | 6/2011 | Swift |
| 8,533,926 B2 | 9/2013 | Holmes, IV |
| 8,585,100 B2 | 11/2013 | Stults |
| 8,925,176 B2 | 1/2015 | Choi |
| 9,249,907 B2 | 2/2016 | Mester |
| 2005/0248152 A1 | 11/2005 | Viegener |
| 2007/0096465 A1 | 5/2007 | Hall |
| 2009/0021001 A1 | 1/2009 | Oh |
| 2012/0043752 A1 | 2/2012 | McPherson |
| 2013/0187380 A1 | 7/2013 | Leggett |
| 2014/0021719 A1 | 1/2014 | Salehi-Bakhtiari |
| 2014/0197633 A1 | 7/2014 | Nixon |
| 2015/0345683 A1 | 12/2015 | Crompton |
| 2017/0234464 A1 | 8/2017 | Lawrence |

FOREIGN PATENT DOCUMENTS

| | | |
|---|---|---|
| JP | 56009026 | 1/1981 |
| WO | 2011025768 | 3/2011 |

OTHER PUBLICATIONS

NIBCO Inc., "NIBCO Press System Lead-Free Brass Ball Valves," online catalog, PC-FP600A-CF, revised Jan. 11, 2017 and Jan. 13, 2017, pp. 31-32.

NIBCO Inc., PC-FP-600A-LF Press Connect Grip Ring Design, enlarged view.

Viega LLC, Viega MegaPress catalog/reference sheet, created Nov. 10, 2014 (per document megadata), publicly available Mar. 30, 2016 (per Wayback Machine at web.archive.org/web/20160330175821/ http://www.viega.US/cps/rde/xbcr/en-US/Viega_SL_MegaPress_ USA_1114.pdf, accessed May 10, 2024), 4 pages.

PIPING CONNECTIONS AND CONNECTION SOCKETS

CROSS-REFERENCE TO RELATED APPLICATIONS

This application is a continuation application of and claims priority under 35 U.S.C. § 120 to U.S. patent application Ser. No. 17/087,020, entitled PIPING CONNECTIONS AND CONNECTION SOCKETS, filed on Nov. 2, 2020, and issued as U.S. Pat. No. 11,708,922 on Jul. 25, 2023, which claims priority under 35 U.S.C. § 120 to U.S. patent application Ser. No. 15/670,239, filed on Aug. 7, 2017, and issued as U.S. Pat. No. 10,823,316 on Nov. 3, 2020, entitled PIPING CONNECTIONS AND CONNECTION SOCKETS, and under 35 U.S.C. § 119(e) to U.S. Provisional Application Nos. 62/491,854, entitled HIGH TEMPERATURE LEAK PREVENTION FOR MECHANICAL JOINED PIPING, filed on Apr. 28, 2017, and 62/534,324, entitled HIGH TEMPERATURE LEAK PREVENTION FOR PIPING COMPONENTS AND CONNECTIONS, filed on Jul. 19, 2017, the entire disclosures of which are incorporated herein by reference.

BACKGROUND OF THE INVENTION

The present disclosure generally relates to connection sockets for tubular connections, more particularly, for piping components and connections with locking rings and other sealing features.

Press connection sockets are used to join piping and components, including couplings, tees, elbows and valves. The press connection is achieved upon closure of a clamshell shaped jaw which forces the socket down securely around the pipe. Some press connections may include grippers or gripping devices configured to grab the pipe. The mechanical advantage afforded by these gripping devices is achieved through distortion of the socket onto the tube. As such, the gripper is wedged between the mating surfaces, creating increased resistance to slip.

Traditional gripper effectiveness is directly related to an amount of inward distortion realized on the connection pieces. There must be an adequate amount of inward distortion of the socket, and a corresponding distortion in the tube, to provide for acceptable resistance to connection slippage. The amount of distortion required to soundly connect press tubular members, both with and without grippers, presents a number of disadvantages with respect to service and performance.

One consequence of the inward distortion of the press connection is a localized restriction and disruption of material flow within the pipe. The pipe may become closed-in at the press connection, creating a local increase in material flow velocity and turbulence. Such a condition can both increase the potential for erosion of the interior pipe surface and cause a reduction in overall flow rate.

Another consequence of the distortion needed for a press connection is the limitations placed on joinery materials. For example, joinery materials, both for the socket and the tube, must possess an adequate level of ductility to undergo press distortion and yet remain in a serviceable condition. This requirement not only places a restriction on the type of press materials used but also may further restrict an otherwise acceptable material to only a specific material condition.

Further, traditional press connections may be prone to failure in high temperature circumstances. For example, polymeric seals present within the connection may fail at elevated temperatures causing a leak of fluid and/or gas present within the press connection.

SUMMARY OF THE DISCLOSURE

According to an aspect of the present disclosure, a connection socket for a tubular connection includes a socket cup having a metal alloy composition and a sealing portion. A primary seal is positioned within the sealing portion. The primary seal includes an elastomeric material having a service temperature. One or more spacer rings are positioned within the sealing portion. A secondary seal is positioned within the sealing portion. The secondary seal includes a metal composition, wherein the secondary seal has a melting temperature at or above the service temperature of the primary seal. One or more locking rings are positioned within the sealing portion, wherein each of the one or more locking rings comprises a biting feature defined along an internal circumference of the locking ring.

According to another aspect of the present disclosure, a connection socket for a tubular connection includes a socket cup having a metal alloy composition and a sealing portion. A primary seal is positioned within the sealing portion. The primary seal includes an elastomeric material having a service temperature. One or more spacer rings are positioned within the sealing portion. One or more locking rings are positioned within the sealing portion, wherein each of the one or more locking rings comprises a metal alloy having a coefficient of thermal expansion greater than a coefficient of thermal expansion of the metal alloy composition of the socket cup.

According to a further aspect of the present disclosure, a connection socket for a tubular connection includes a socket cup having a metal alloy composition and a sealing portion. A primary seal is positioned within the sealing portion. The primary seal includes an elastomeric material having a service temperature. A spacer ring is positioned within the sealing portion. A locking ring is positioned within the sealing portion, wherein the locking ring comprises a biting feature.

According to yet another aspect of the present disclosure, a connection socket for a tubular connection is provided that includes a socket cup comprising a metal alloy composition and a sealing portion. The socket further includes a primary seal positioned within the sealing portion, the primary seal comprising an elastomeric material. The connection socket further includes one or more spacer rings positioned within the sealing portion. The one or more spacer rings are between the one or more locking rings and the primary seal. Each of the one or more locking rings comprises multiple biting features. Each of the one or more locking rings comprises a metal alloy having a coefficient of thermal expansion (CTE) greater than a coefficient of thermal expansion of the metal alloy composition of the socket cup. Further, each of the one or more locking rings aids in sealing a pipe under high temperature exposure of the pipe and the connection socket.

According to a further aspect of the present disclosure, a connection socket for a tubular connection is provided that includes a socket cup comprising a metal alloy composition and a sealing portion. The connection socket further includes a primary seal positioned within the sealing portion, the primary seal comprising an elastomeric material. The connection socket also includes one spacer ring positioned within the sealing portion; and a locking ring positioned within the sealing portion. The one spacer ring is between the locking ring and the primary seal. The locking ring comprises multiple biting features. The locking ring comprises a metal alloy having a coefficient of thermal expansion (CTE) greater than a coefficient of thermal expansion of the metal alloy composition of the socket cup. Further, the locking ring aids in gripping a pipe under high temperature exposure of the pipe and connection socket.

According to another aspect of the present disclosure, a connection socket for a tubular connection is provided that consists of a socket cup comprising a metal alloy composition and a sealing portion; a primary seal positioned within the sealing portion, the primary seal comprising an elastomeric material; one spacer ring positioned within the sealing portion; and a locking ring positioned within the sealing portion. The one spacer ring is between the locking ring and the primary seal. The locking ring comprises multiple biting features. The locking ring comprises a metal alloy having a coefficient of thermal expansion (CTE) greater than a coefficient of thermal expansion of the metal alloy composition of the socket cup. Further, the locking ring aids in gripping a pipe under high temperature exposure of the pipe and connection socket.

According to a further aspect of the present disclosure, a connection socket for a tubular connection includes a socket cup having a metal alloy composition and a sealing portion. A primary seal is positioned within the sealing portion. The primary seal includes an elastomeric material having a service temperature. One or more spacer rings are positioned within the sealing portion. A secondary seal is positioned within the sealing portion. The secondary seal includes a metal composition, wherein the secondary seal has a melting temperature at or above the service temperature of the primary seal. One or more locking rings are positioned within the sealing portion, wherein each of the one or more locking rings comprises a biting feature defined along an internal circumference of the locking ring.

According to another aspect of the present disclosure, a connection socket for a tubular connection includes a socket cup having a metal alloy composition and a sealing portion. A primary seal is positioned within the sealing portion. The primary seal includes an elastomeric material having a service temperature. One or more spacer rings are positioned within the sealing portion. One or more locking rings are positioned within the sealing portion, wherein each of the one or more locking rings comprises a metal alloy having a coefficient of thermal expansion greater than a coefficient of thermal expansion of the metal alloy composition of the socket cup.

According to another aspect of the present disclosure, a connection socket for a tubular connection includes a socket cup having a metal alloy composition and a sealing portion. A primary seal is positioned within the sealing portion. The primary seal includes an elastomeric material having a service temperature. A spacer ring is positioned within the sealing portion. A locking ring is positioned within the sealing portion, wherein the locking ring comprises a biting feature.

According to a first aspect of the present disclosure, a connection socket for a tubular connection, includes: a socket cup comprising a metal alloy composition and a sealing portion; a primary seal positioned within the sealing portion, the primary seal comprising an elastomeric material; one or more spacer rings positioned within the sealing portion; and one or more locking rings positioned within the sealing portion and comprising a metal alloy composition. The one or more spacer rings are between the one or more locking rings and the primary seal. Each of the one or more locking rings comprises multiple biting features. Each of the one or more locking rings aids in sealing a pipe under high temperature exposure of the pipe and the connection socket. Further, each of the one or more spacer rings comprises a metal alloy composition with a coefficient of thermal expansion (CTE) that is greater than the CTE of the metal alloy composition of the socket cup, and wherein each of the one or more spacer rings aids in sealing the pipe under high temperature exposure of the pipe and the connection socket.

According to a second aspect of the present disclosure, the first aspect is provided, wherein the metal alloy composition of each of the one or more locking rings is a stainless steel.

According to a third aspect of the present disclosure, the second aspect is provided, wherein the metal alloy composition of the socket cup is a carbon steel.

According to a fourth aspect of the present disclosure, the third aspect is provided, wherein the metal alloy composition of the one or more spacer rings is a stainless steel or a brass.

According to a fifth aspect of the present disclosure, the first aspect is provided, wherein each of the biting features of each of the one or more locking rings defines a sharp point.

According to a sixth aspect of the present disclosure, the fifth aspect is provided, wherein each biting feature defines a discontinuous structure along an internal circumference of each of the one or more locking rings.

According to a seventh aspect of the present disclosure, a connection socket for a tubular connection includes: a socket cup comprising a metal alloy composition and a sealing portion; a primary seal positioned within the sealing portion, the primary seal comprising an elastomeric material; one spacer ring positioned within the sealing portion; and a locking ring positioned within the sealing portion and comprising a metal alloy composition. The one spacer ring is between the locking ring and the primary seal. The locking ring comprises multiple biting features. The locking ring aids in gripping a pipe under high temperature exposure of the pipe and connection socket. Further, the one spacer ring comprises a metal alloy composition with a coefficient of thermal expansion (CTE) that is greater than the CTE of the metal alloy composition of the socket cup, and wherein the one spacer ring aids in sealing the pipe under high temperature exposure of the pipe and the connection socket.

According to an eighth aspect of the present disclosure, the seventh aspect is provided, wherein the metal alloy composition of the locking ring is a stainless steel.

According to a ninth aspect of the present disclosure, the eighth aspect is provided, wherein the metal alloy composition of the socket cup is a carbon steel.

According to a tenth aspect of the present disclosure, the ninth aspect is provided, wherein the metal alloy composition of the one spacer ring is a stainless steel or a brass.

According to an eleventh aspect of the present disclosure, the seventh aspect is provided, wherein each of the biting features of the locking ring defines a sharp point.

According to a twelfth aspect of the present disclosure, the eleventh aspect is provided, wherein each biting feature defines a discontinuous structure along an internal circumference of the locking ring.

According to a thirteenth aspect of the present disclosure, the eleventh aspect is provided, wherein each biting feature defines one or more chamfered edges.

According to a fourteenth aspect of the present disclosure, a connection socket for a tubular connection consists of: a socket cup comprising a metal alloy composition and a sealing portion; a primary seal positioned within the sealing portion, the primary seal comprising an elastomeric material; one spacer ring positioned within the sealing portion; and a locking ring positioned within the sealing portion and comprising a metal alloy composition. The one spacer ring is between the locking ring and the primary seal. The locking ring comprises multiple biting features. The locking ring aids in gripping a pipe under high temperature exposure of the pipe and connection socket. Further, the one spacer ring comprises a metal alloy composition with a coefficient of thermal expansion (CTE) that is greater than the CTE of the metal alloy composition of the socket cup, and wherein the one spacer ring aids in sealing the pipe under high temperature exposure of the pipe and the connection socket.

According to a fifteenth aspect of the present disclosure, the fourteenth aspect is provided, wherein the metal alloy composition of the locking ring is a stainless steel.

According to a sixteenth aspect of the present disclosure, the fifteenth aspect is provided, wherein the metal alloy composition of the socket cup is a carbon steel.

According to a seventeenth aspect of the present disclosure, the sixteenth aspect is provided, wherein the metal alloy composition of the spacer ring is a stainless steel or a brass.

According to an eighteenth aspect of the present disclosure, the fourteenth aspect is provided, wherein each of the biting features of the locking ring defines a sharp point.

According to a nineteenth aspect of the present disclosure, the eighteenth aspect is provided, wherein each biting feature defines a discontinuous structure along an internal circumference of the locking ring.

According to a twentieth aspect of the present disclosure, the eighteenth aspect is provided, wherein each biting feature defines one or more chamfered edges.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
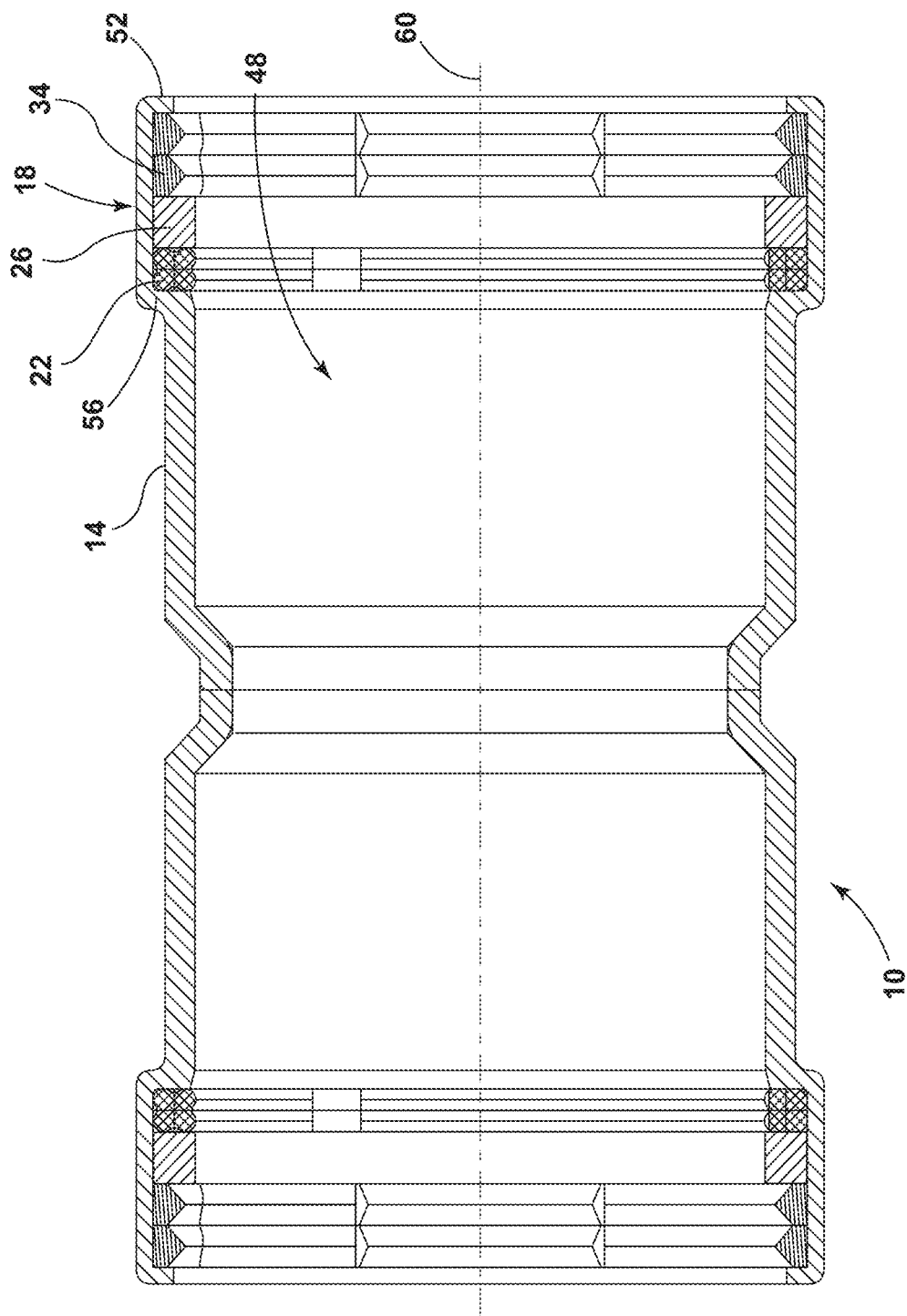
FIG. 1 is a cross-sectional view of a connection socket, according to one or more examples.
Figure 2C:
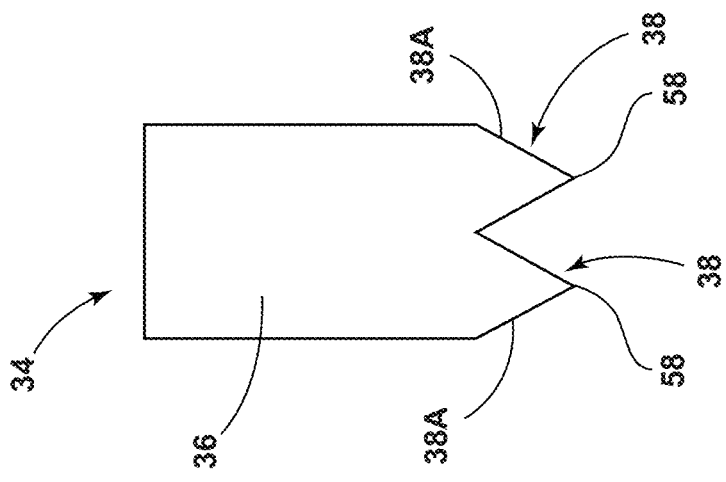
FIG. 2C is a cross-sectional view of a locking ring, according to one or more examples.
Figure 2B:
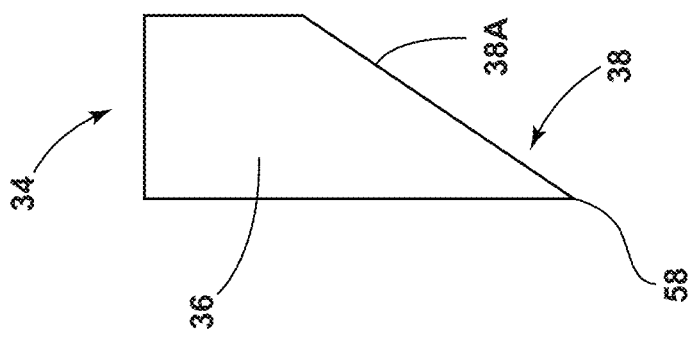
FIG. 2B is a cross-sectional view of a locking ring, according to one or more examples.
Figure 2A:
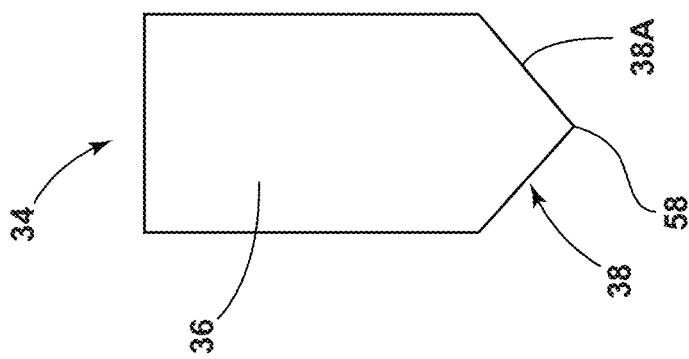
FIG. 2A is a cross-sectional view of a locking ring, according to one or more examples.
Figure 3A:
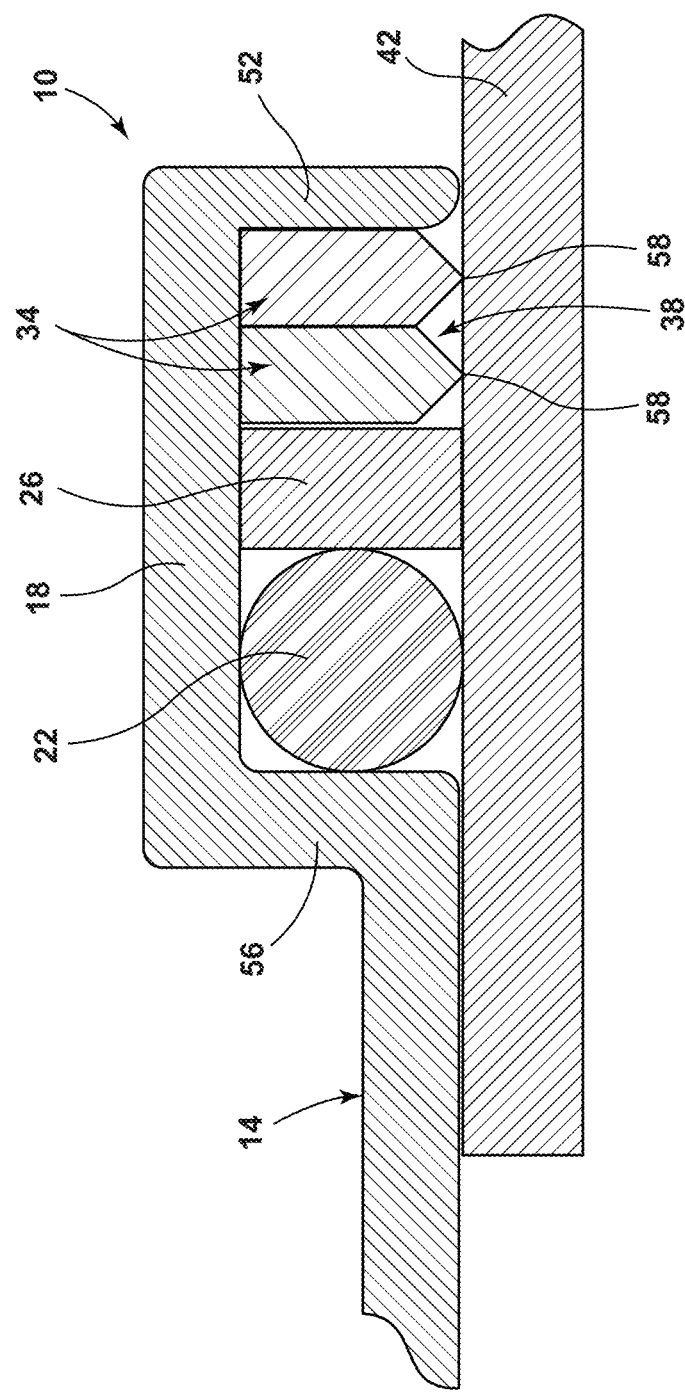
FIG. 3A is a cross-sectional view of a connection socket, according to one or more examples.
Figure 3B:
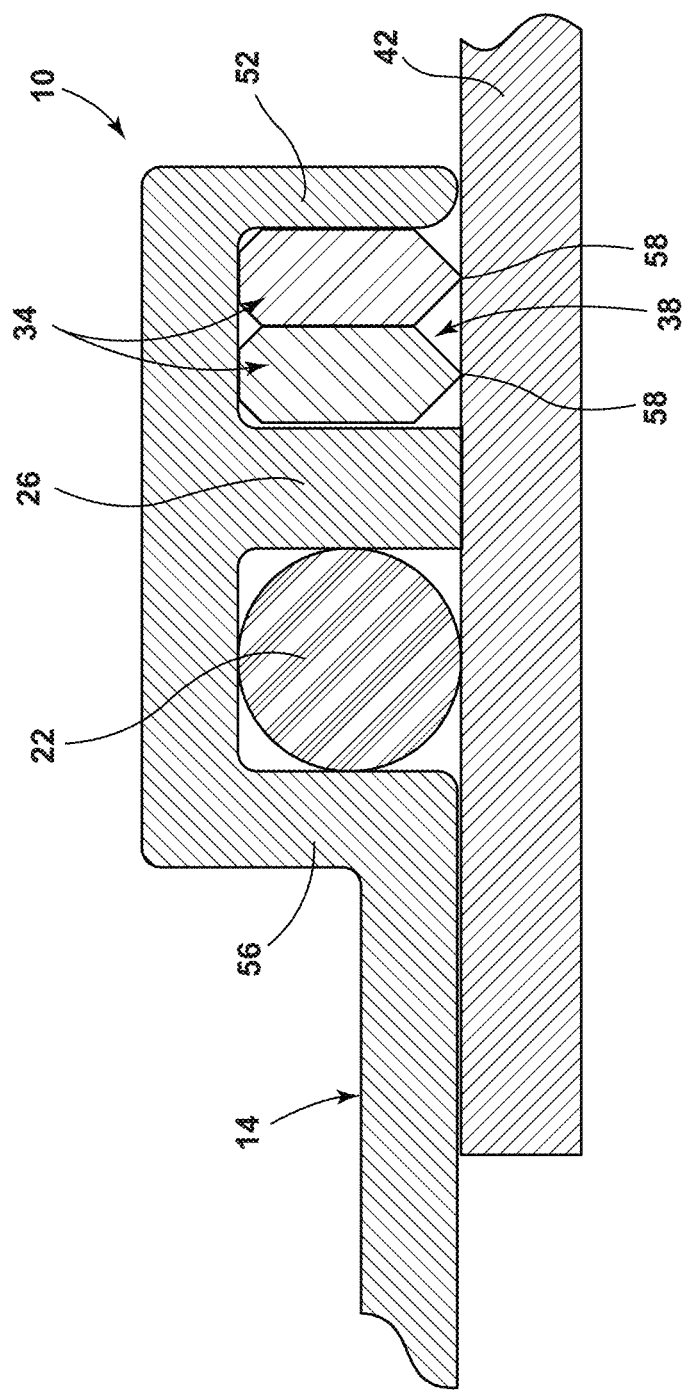
FIG. 3B is a cross-sectional view of a connection socket, according to one or more examples.
Figure 4A:
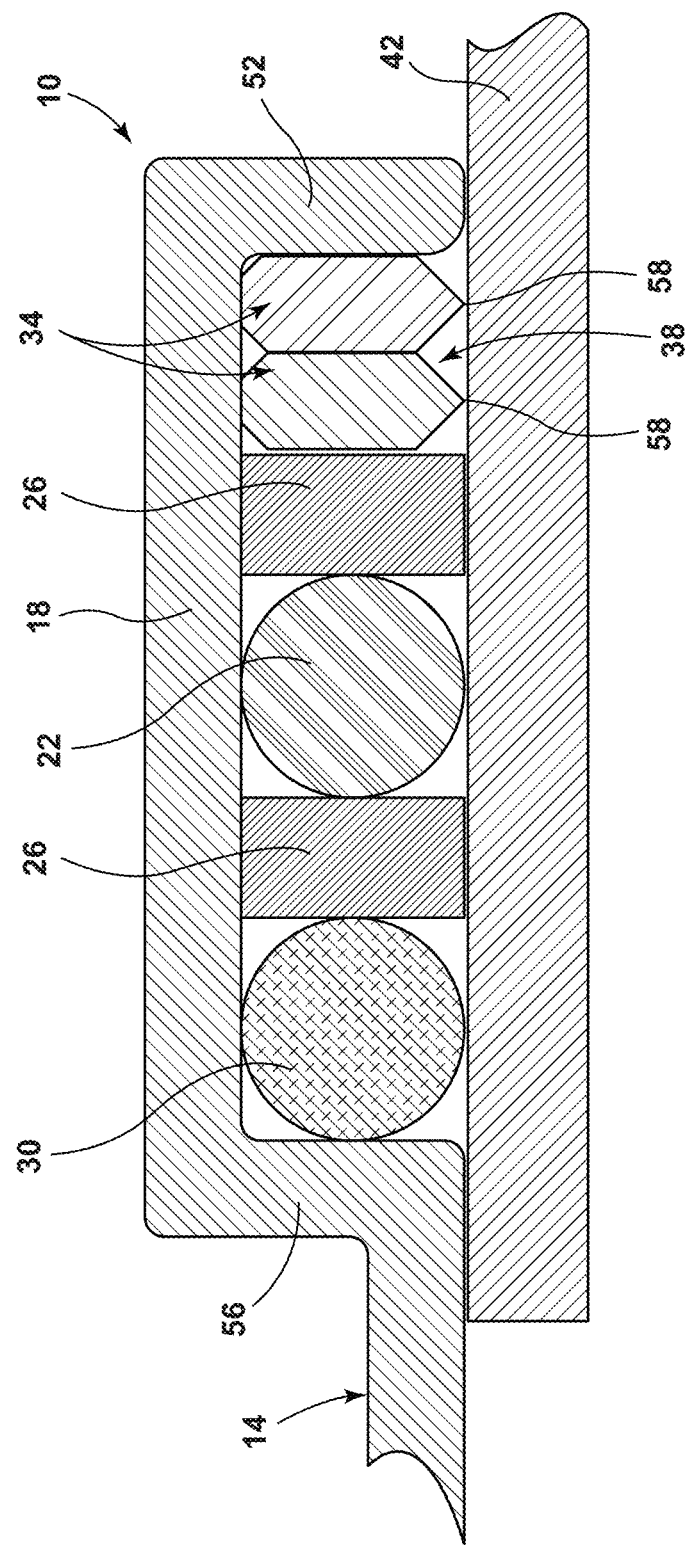
FIG. 4A is a cross-sectional view of a connection socket, according to one or more examples.
Figure 4B:
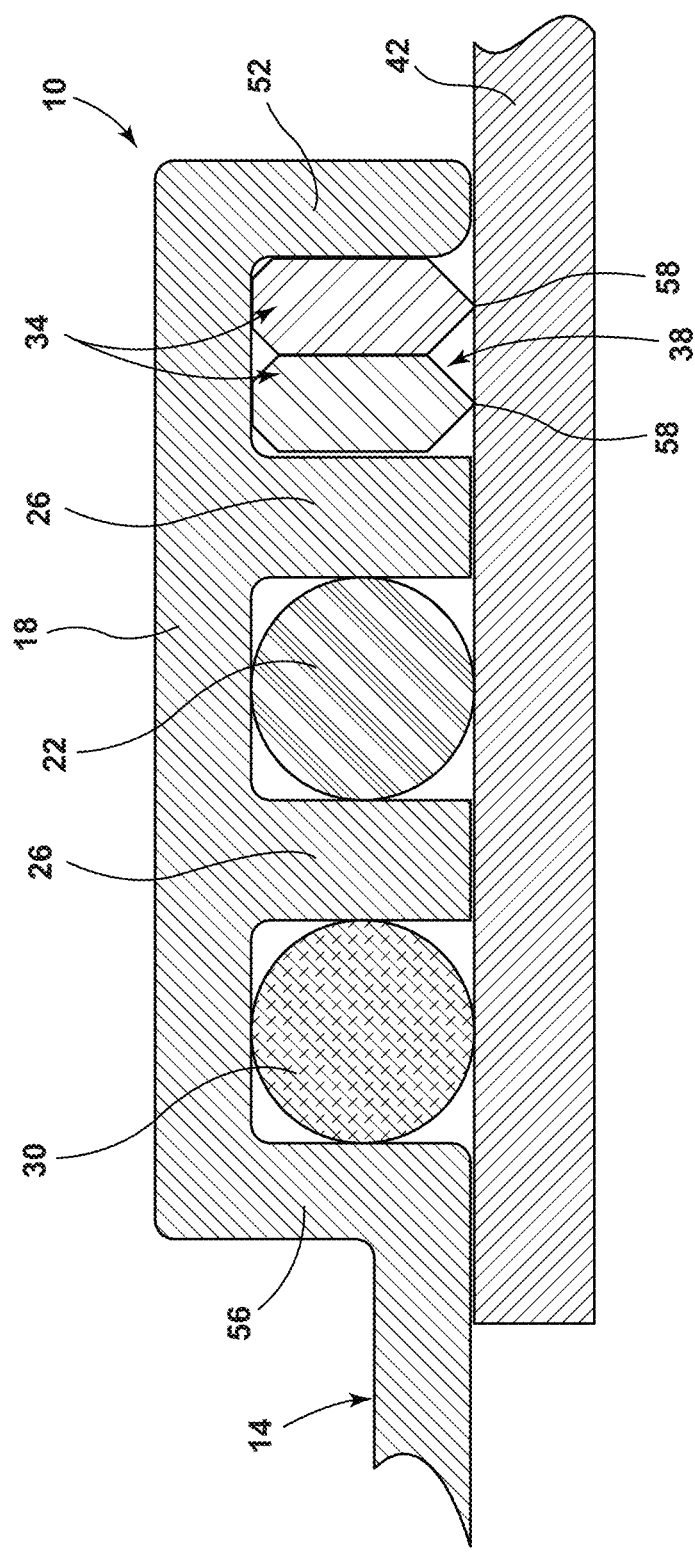
FIG. 4B is a cross-sectional view of a connection socket, according to one or more examples.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5B, reference numeral 10 generally designates a connection socket for a tubular connection. The connection socket 10 may include a socket cup 14 having a metal alloy composition and a sealing portion 18. A primary seal 22 may be positioned within the sealing portion 18. According to various examples, the primary seal 22 may include an elastomeric material having a service temperature. One or more spacer rings 26 may be positioned within the sealing portion 18. A secondary seal 30 may be positioned within the sealing portion 18. According to various examples, the secondary seal 30 may include a metal composition and have a melting temperature at or above the service temperature of the primary seal 22. One or more locking rings 34 may be positioned within the sealing portion 18. Each of the one or more locking rings 34 may include one or more biting features 38 defined along an internal circumference of the locking ring 34.

The connection socket 10 may be configured to facilitate the joining of one or more pipes 42 to enable the transfer of a fluid (e.g., gas and/or liquids) between the pipes 42 without leakage. Further, the connection socket 10 may be sealed and used to terminate or otherwise cap a pipe 42. Still further, those with ordinary skill in the art can appreciate that the connection socket 10 may be configured as a valve. In the depicted examples, the connection socket 10 is a straight coupling, but can be any connection socket used to join piping and components, including couplings, tees, elbows and valves. In some examples, the connection socket 10 is a press connection. For purposes of this disclosure, a press connection may be a type of connection which is configured to receive the closure of a clam-shell shaped jaw around the connection (e.g., the sealing portion 18 and/or socket cup 14) which forces the socket connection 10 down securely around the pipe 42.

The connection socket 10 includes the socket cup 14. In the depicted example, the connection socket 10 includes two socket cups 14, but it will be understood that the connection socket 10 may include one socket cup 14 or may include three or greater socket cups 14. It will be understood that although to following description is in relation to a single socket cup 14, the disclosure provided herein may be applied to a plurality of socket cups 14 of the connection socket 10. Further, the configuration of locking rings 34, spacer rings 26, primary seals 22 and/or secondary seals 30 may vary among the socket cups 14 without departing from the teachings provided herein. According to various examples, the connection socket 10 and/or the socket cup 14 may be composed of a metal composition. For example, one or more components of the connection socket 10 may be composed of copper alloys (e.g., such as brasses and bronzes), iron based alloys (e.g., steel, black iron, carbon steels and/or stainless steels) and/or other metal and metal alloy compositions. The connection socket 10 may be manufactured via casting, forging, extrusion and/or die casting. Further, the connection socket 10 may undergo one or more tempering, annealing and/or post processing treatments.

Referring now to FIG. 1, the socket cup 14 of the connection socket 10 defines a recessed cavity 48 which is configured to accept the insertion of the pipe 42 into the connection socket 10. The recessed cavity 48 may extend throughout the connection socket 10 and may be straight or have a curve or bend. The socket cup defines the sealing portion 18 as a recess within an internal surface of the socket cup 14. The recess of sealing portion 18 may be defined between an outboard lip 52 and an inboard lip 56. Although depicted as a single continuous recess, the sealing portion 18 may define a number of recesses (e.g., as explained in greater detail below with relation to the spacer rings 26). For example, the sealing portion 18 may define one or more recesses extending parallel to an axis 60 of the connection socket 10. Additionally or alternatively, the recess of the sealing portion 18 may be divided into a plurality of smaller recesses which extend around an internal circumference of the connection socket 10. In other examples, the sealing portion 18 may be a single continuous or discontinuous structure extending around the internal circumference of the socket cup 14.

Referring now to FIG. 1 and FIGS. 2A-2C, the connection socket 10 includes one or more locking rings 34. For example, a plurality of locking rings 34 is positioned within the sealing portion 18. The connection socket 10 may include, one or more, two or more, three or more, four or more, five or more, or six or more locking rings 34 per sealing portion 18. In the depicted example, the locking rings 34 are positioned at an outboard location within the sealing portion 18, but it will be understood that the locking rings 34 may be positioned at an inboard location of the sealing portion 18. Further, although depicted as grouping the locking rings 34 to a single location, it will be understood that the locking rings 34 may be spread across the sealing portion 18 and not in contact with one another. According to various examples, the locking rings 34 may be composed of a metallic composition. For example, the locking rings 34 may be composed of a hard, high strength steel to provide for adequate grip on the pipe 42. According to various examples, one or more of the locking rings 34 includes a material having a higher coefficient of thermal expansion (CTE) than a metal alloy composition of the socket cup 14. The CTE of the locking rings 34 may be about $7.0*10^{-6}$ per °F. or greater, about $8.0*10^{-6}$ per °F. or greater, about $9.0*10^{-6}$ per °F. or greater, about $10.0*10^{-6}$ per °F. or greater, about $11.0*10^{-6}$ per °F. or greater, about $12.0*10^{-6}$ per °F. or greater, about $13.0*10^{-6}$ per °F. or greater, about $14.0*10^{-6}$ per °F. or greater, about $15.0*10^{-6}$ per °F. or greater, about $16.0*10^{-6}$ per °F. or greater, about $17.0*10^{-6}$ per °F. or greater, about $18.0*10^{-6}$ per °F. or greater, about $19.0*10^{-6}$ per °F. or greater, or about $20.0*10^{-6}$ per °F. or greater. The relatively high CTE of the locking ring 34 may aid in the "grip" or mechanical force applied to the pipe 42 under high temperature exposure. In other words, the increased CTE may cause the biting feature 38 of the locking ring 34 to engage the pipe 42 with greater force when heated. Such material advantage, combined with the ability to use multiple locking rings 34, allows for there to be different materials combined in a single socket connection 10. For example, a high strength mild steel may be used for a first locking ring 34 for ambient temperature performance and a second stainless steel locking ring 34 with a greater CTE can be included for extreme temperature exposures. Further, the CTE of the locking rings 34 may be greater than the pipe 42 inserted into the connection socket 10. According to various examples, one or more of the locking rings 34 includes a material having a higher elastic modulus than a metal alloy composition of the socket cup 14. Such a higher elastic modulus may lead to a higher hardness of the locking ring 34 as compared to the socket cup 14. Further, the elastic modulus of the locking ring 34 may be higher than the pipe 42 which is inserted in the connection socket 10.

The one or more locking rings 34 may be positioned within the recess of the sealing portion 18. The locking rings 34 may be separate components from the socket cup 14 which are positioned within the connection socket 10 and/or may be defined by the socket cup 14. In some examples, the connection socket 10 may define some locking rings 34 and have other locking rings 34 positioned in the sealing portion 18. In examples where the locking rings 34 are separate components from the socket cup 14, one or more of the locking rings 34 may be of a split ring design. Split ring designs of the locking ring 34 may be discontinuous or define one or more breaks in the locking ring 34. The locking rings 34 may define a body feature 36 on which the biting feature 38 (or biting features 38) is positioned. The body feature 36 may be generally square and/or rectangular is cross-sectional shape. Further, the body feature 36 may have a higher order polygon shape. The body feature 36 may be the portion of the locking ring 34 which rests against the sealing portion 18. The body feature 36 may be chamfered (e.g., FIG. 3B) proximate where the locking ring 34 meets the sealing portion 18. Such a feature may be advantageous in inserting the locking rings 34 into the recess of the sealing portion 18.

The locking rings 34 define may include and/or define the biting feature 38 (or biting features 38) on an inboard side of the locking ring 34 and/or on an internal circumference of the ring 34. The locking rings 34 may define a single biting feature 38 (e.g., FIGS. 2A and 2B) or may define multiple biting features 38 (e.g., FIG. 2C). The biting feature 38 may define at least one point 58 configured to engage the pipe 42. Each of the biting features 38 may define one or more chamfered edges 38A which produce the point 58. The point 58 of the biting feature 38 extends around the internal circumference of the locking ring 34. In some examples, the biting feature 38 defines a single point 58 (e.g., FIGS. 2A and 2B), while in other examples the biting feature 38 defines a plurality of points 58 (e.g., FIG. 2C). The point 58 may be centrally located (e.g., FIGS. 2A and 2C) or set in line with an inboard or outboard edge of the locking ring 34 (e.g., FIG. 2B). Further, the locking ring 34 may be coiled such that a single ring 34 defines a single continuous biting feature 38 extending through the sealing portion 18 in a spiraling manner. The point 58 may be sharp or otherwise define a thin edge such that crimping of the connection socket 10 around the pipe 42 causes the point 58 of the biting feature 38 to engage, deform, mechanically couple, or cut into the pipe 42. The point 58 may be a single continuous structure extending along the internal circumference of the locking ring 34, or may be a discontinuous structure defining one or more breaks in order to match a requisite amount of penetration into and/or points of contact on the pipe 42. For example, a soft copper pipe 42 may require the locking ring 34 to engage multiple points of contact to avoid the creation of a single point of high stress and/or deformation, resulting in a stress riser that could weaken the pipe 42. In another example, a hard, high strength black iron pipe 42 may require a single continuous point 58 on the lock ring 34 to produce the greatest amount of pipe indentation to secure a connection without concern over weakening the pipe 42. Although the locking ring(s) 34 are described as defining the biting feature 38, it will be understood that various examples of the locking rings 34 may not include a biting feature 38 without departing from the teachings provided herein. In such examples, the locking rings 34 may define a flat or curved surface which may be compression fit, or otherwise coupled to, the pipe 42.

Referring now to FIGS. 3A-5B, the sealing portion 18 of the socket cup 14 may include one or more spacer rings 26. The socket connection 10 may have one or more, two or more, three or more, four or more or five or more spacer rings 26 per socket cup 14. In some examples, one or more of the spacer rings 26 may be integrally defined by the socket cup 14 (e.g., FIGS. 3B, 4B and 5B). In yet other examples, one or more of the spacer rings 26 may have a separate component from the connection socket 10 (e.g., FIGS. 3A, 4A and 5A) which is inserted into the sealing portion 18. It will be understood that the connection socket 10 may include both integral and separate spacer rings 26 without departing from the teachings provided herein. The spacer rings 26 are configured to separate the locking rings 34 from the primary seal 22 and/or the secondary seal 30. According to various examples, the spacer rings 26 may be composed of a material having a relatively high CTE. For example, the spacer rings 26 may have a CTE greater than that of the metal alloy composition of the socket cup 14, the locking rings 34 and/or the pipe 42. Use of the high CTE material as the spacer ring 26 may be advantageous in closing off a capillary path of a molten low melt point temperature failsafe material (e.g., the secondary seal 30) as it melts. Further, the spacer ring 26 may be composed of a braze filler and used in conjunction with low melting point solder examples of the spacer rings 26.

The primary seal 22 is positioned inboard, or upstream, of the locking rings 34, but downstream, or outboard, of the secondary seal 30 (e.g., in examples of the connection socket 10 including the secondary seal 30). Although shown with a single primary seal 22, it will be understood that the connection socket 10 may include a plurality of primary seals 22. For example, the connection socket 10 may include two, three, four or greater primary seals 22. The primary seals are fabricated from a polymeric material, preferably an elastomeric material, suitable for use in the application as understood by those with ordinary skill in the field of the disclosure. The sealing portion 18 and/or the socket cup 14 may define one or more sealing recesses configured to seal the primary seal 22 to prevent migration of the primary seal 22 during and after the connection socket 10 is joined to the pipe 42.

The primary seal 22 may be composed of an elastomeric material, polymeric materials, composites and/or combinations thereof. Exemplary elastomeric materials may include an ethylene propylene diene monomer (EPDM). In other implementations, the primary seal 22 includes an elastomeric material selected from the group consisting of, or including a silicone rubber, a nitrile rubber, an ethylene propylene diene monomer (EPDM) rubber, a fluorocarbon-based rubber, a fluorosilicone rubber, and a polytetrafluoroethylene (PTFE) material. The primary seal 22 may be fabricated from a polymeric material with a maximum service temperature of about 400° F. (about 204° C.) or less, 350° F. (about 177° C.) or less in some examples, or 300° F. (about 149° C.) or less in other examples. As used herein, the "service temperature" is defined such that as the primary seal(s) 22 are exposed to temperatures at or above the service temperature, the seal begins to degrade (e.g., via combustion, oxidation or other process resulting in weight loss to the seal) to an extent in which any sealing afforded by the seal 22 in the sealing portion 18 (e.g., to the pipe 42), begins to fail (e.g., as evidenced by a pressure loss of at least 10% associated with any media in the connection socket 10).

Figure 5A:
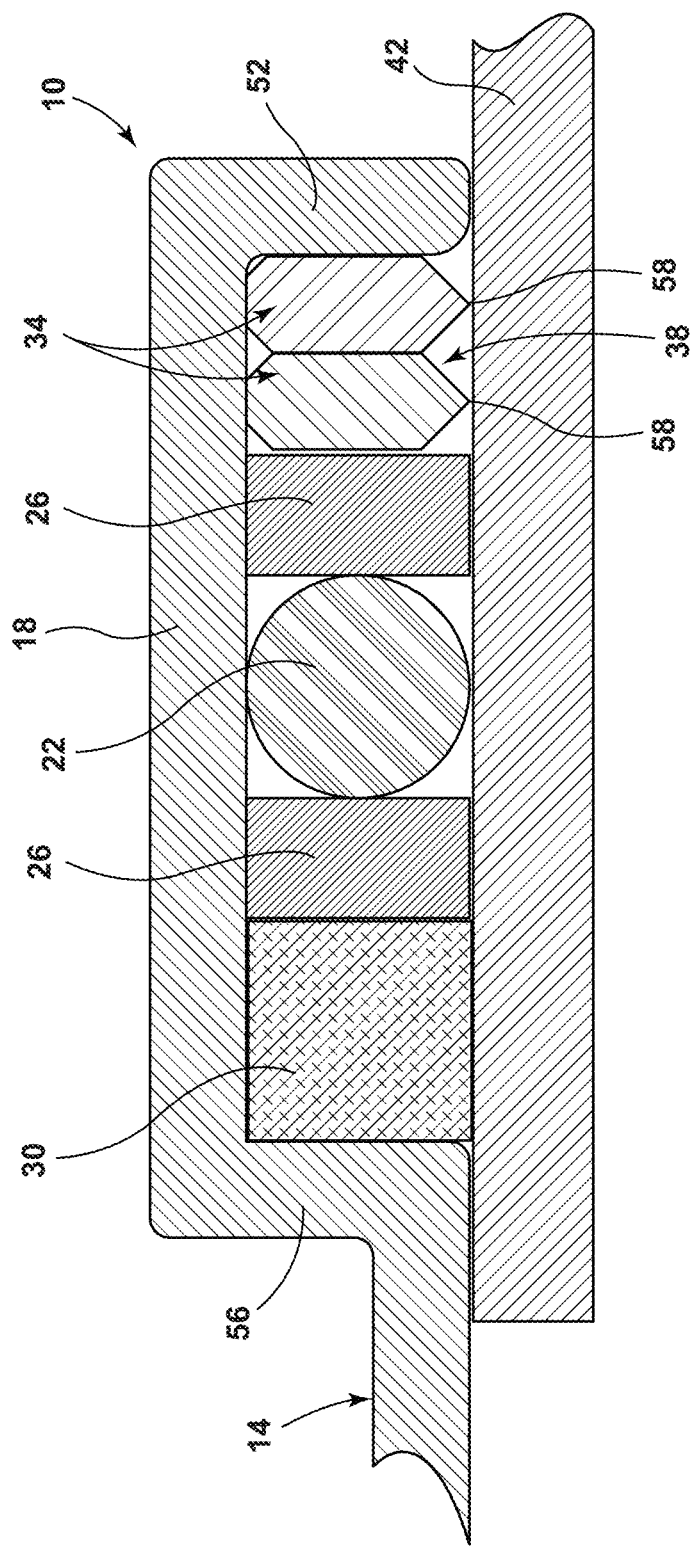
FIG. 5A is a cross-sectional view of a connection socket, according to one or more examples.
Figure 5B:
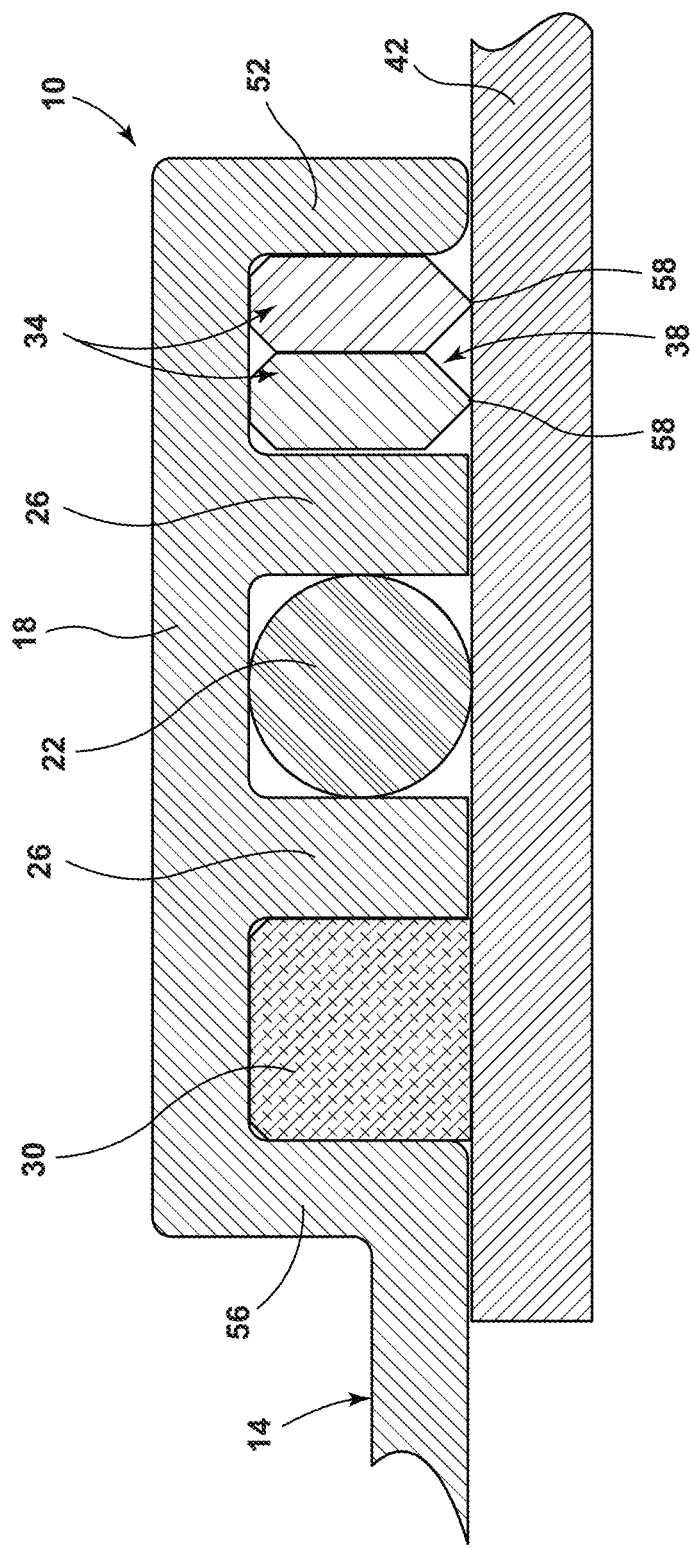
FIG. 5B is a cross-sectional view of a connection socket, according to one or more examples.

In examples of the connection socket 10 utilizing the secondary seal 30, the secondary seal 30 is positioned within the sealing portion 18 of the socket cup 14. It will be understood that the secondary seal 30 is optional and that the connection socket 10 may not include the secondary seal 30. According to various examples, the secondary seal 30 is positioned inboard, or upstream, of the primary seal 22 and/or the one or more locking rings 34, but it will be understood that the secondary seal 30 may be positioned outboard of one or more of the locking rings 34 and/or primary seal 22 without departing form the teachings provided herein. In some examples, the secondary seal 30 is configured as a ring with a round cross-section (e.g., FIGS. 4A and 4B). In other examples, the secondary seal 30 has a rectangular cross-section (FIGS. 5A and 5B). The secondary seal 30 may be fabricated from a metal composition (e.g., a solder, brazing alloy, other metal alloy, etc.). According to various examples, the secondary seal 30 is composed of a low melting point metallic or intermetallic material.

The secondary seal 30 may be fabricated from a composition that has a melting temperature that resides at or above the service temperature of the primary seal 22. For example, the secondary seal 30 may be fabricated from a material with a melting temperature that exceeds the service temperature of the primary seal 22 by about 50° C., about 100° C., about 150° C., about 200° C. or more. In other examples, the secondary seal 30 may be made from a metal alloy having a softening or melting temperature between about 600° F. (about 316° C.) and about 1000° F. (about 538° C.). According to various examples, the secondary seal 30 has a melting temperature at or below a service temperature of the metal alloy composition of the socket cup 14. In at least one example, the secondary seal 30 is fabricated from a conventional lead-free 95-5 solder with a melting range of about 450° F. (about 232° C.) to about 464° F. (about 240° C.). In other examples, the secondary seal 30 is composed of a brazing alloy or a solder alloy composition.

The connection socket 10 is advantageously configured to allow for short-term leak protection during a high temperature or otherwise extreme temperature exposure. As noted earlier, the connection socket 10 may be configured with at least one secondary seal 30 that becomes active and serves as a temporary seal in the event of a fire or other extreme temperature event, taking over for or acting in synergy with a failed primary seal 22. As the primary seal 22 degrades or otherwise fails from exposure to temperatures at or above its service temperature, the secondary seal 30, which is fabricated from a metal composition that melts at or above the service temperature of the primary seal 22, can begin to melt and flow. Upon flow and/or melting, the secondary seal 30 can flow through the sealing portion 18 and/or the gap between the outer diameter of the pipe 42 and the inner surface of the socket cup 14. Flow of the secondary seal 30 is facilitated by both capillary action afforded by the gap between the outer diameter of the pipe 42 and the inner surface of the socket cup 14, along with applied pressure from the media (e.g., gas) flowing within the pipe 42.

The ability of the secondary seal 30 in the connection socket 10 to perform as a high-temperature seal can be dictated by the heat sensitivity or survivability of the primary seal 22, with lower maximum temperature primary seals 22 requiring lower melting point secondary seals 30 (e.g., fusible alloys or solders). The ability of the secondary seal 30 to function as a high-temperature seal can also be influenced by the connection spacing between the primary seal 22 and the secondary seal 30. That is, the gap formed between the parallel surfaces of the outside diameter of the pipe 42 and the inner surface of the socket cup 14 must be within a range that allows for capillary flow of molten alloy (liquid or semi-liquid) from the secondary seal 30. The ability of the secondary seal 30 to function as a high-temperature seal may also be influenced by the melt range of the secondary seal 30 (e.g., as framed by the solidus and liquidus temperatures of metallic examples). Accordingly, the composition of the secondary seal 30 can be selected based upon the target temperature of the secondary seal 30 at which it should flow to provide a secondary seal upon failure of the primary seal 22. That is, the composition of the secondary seal 30 can be selected such that the high temperature target associated with failure of the primary seal 22 falls within the semi-solid phase of the secondary seal 30.

As the primary seal 22 degrades or otherwise fails from exposure to temperatures at or above its service temperature, the secondary seal 30 (and tertiary seal of the same composition, if present), which is fabricated from a metal composition that melts at or above the service temperature of the primary seal 22, can begin to melt and flow. Upon flow and/or melting, the secondary seal 30 (and tertiary seal, if present) can flow into the regions formerly occupied by the primary seal 22 and/or the gap between the outer diameter of the pipe 42 and the inner surface of the socket cup 14.

Use of the present disclosure may offer a variety of advantages. First, use of high coefficient of thermal expansion materials for the spacer ring 26 may increase sealing of the connection socket 10. For example, as the spacer ring 26 is set between the primary seal 22 and the locking ring 34 or set between the secondary seal 30 and the primary ring 22 can be made of an alloy with high thermal expansion properties, high thermal loads (e.g., from a fire) provide a tighter fit between the pipe 42 and the socket connection 10 due to the expansion of the spacer ring(s) 26. The added expansion afforded the spacer ring 26 during high temperature exposure can provide additional primary seal 22 compression and/or a reduction in the capillary gap that is filled by the metal of the secondary seal 30 to provide a temporary high temperature safety seal. Second, use of the secondary seal 30 offers a unique safety feature that allows for short-term leak protection of a seal during an extreme temperature exposure. For example, the mechanical joinery of the disclosure can be employed in a gas line to provide such protection during a catastrophic fire event. As the secondary seal 30 becomes active and serves as a temporary seal in the event of a fire or other extreme temperature event, the connection socket 10 may remain sealed above the service temperature of the primary seal 22. The additional time offered by the connection socket 10 prior to seal failure from the high temperature event can be crucial to the safety of individuals in proximity to the event that caused the high temperature event (e.g., a fire). Third, use of locking rings 34 having a high coefficient of thermal expansion may be advantageous in creating a greater sealing force. For example, in high temperature events of the connection socket 10, the locking rings 34 may form a tighter mechanical connection against the pipe 42 when high coefficient of thermal expansion materials are utilized. It will be understood that some or all of the above noted advantages may be obtained without or without the presence of the secondary seal 30.

It will be understood that although the examples depicted herein have been separated for purposes of clarity, features of the various examples may be combined without departing from the teachings provided herein.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents.

What is claimed is:

1. A connection socket for a tubular connection, comprising:
   a socket cup comprising a metal alloy composition and a sealing portion;
   a primary seal positioned within the sealing portion, the primary seal comprising an elastomeric material;
   one or more spacer rings positioned within the sealing portion; and
   one or more locking rings positioned within the sealing portion and comprising a metal alloy composition, wherein the one or more spacer rings are between the one or more locking rings and the primary seal, wherein each of the one or more locking rings comprises multiple biting features, wherein each of the one or more locking rings aids in sealing a pipe under high temperature exposure of the pipe and the connection socket, and further wherein each of the one or more spacer rings comprises a metal alloy composition with a coefficient of thermal expansion (CTE) that is greater than the CTE of the metal alloy composition of the socket cup, and wherein each of the one or more spacer rings aids in sealing the pipe under high temperature exposure of the pipe and the connection socket.

2. The socket according to claim 1, wherein the metal alloy composition of each of the one or more locking rings is a stainless steel.

3. The socket according to claim 2, wherein the metal alloy composition of the socket cup is a carbon steel.

4. The socket according to claim 3, wherein the metal alloy composition of the one or more spacer rings is a stainless steel or a brass.

5. The socket according to claim 1, wherein each of the biting features of each of the one or more locking rings defines a sharp point.

6. The socket according to claim 5, wherein each biting feature defines a discontinuous structure along an internal circumference of each of the one or more locking rings.

7. A connection socket for a tubular connection, comprising:
a socket cup comprising a metal alloy composition and a sealing portion;
a primary seal positioned within the sealing portion, the primary seal comprising an elastomeric material;
one spacer ring positioned within the sealing portion; and
a locking ring positioned within the sealing portion and comprising a metal alloy composition,
wherein the one spacer ring is between the locking ring and the primary seal,
wherein the locking ring comprises multiple biting features,
wherein the locking ring aids in gripping a pipe under high temperature exposure of the pipe and connection socket, and
further wherein the one spacer ring comprises a metal alloy composition with a coefficient of thermal expansion (CTE) that is greater than the CTE of the metal alloy composition of the socket cup, and wherein the one spacer ring aids in sealing the pipe under high temperature exposure of the pipe and the connection socket.

8. The socket according to claim 7, wherein the metal alloy composition of the locking ring is a stainless steel.

9. The socket according to claim 8, wherein the metal alloy composition of the socket cup is a carbon steel.

10. The socket according to claim 9, wherein the metal alloy composition of the one spacer ring is a stainless steel or a brass.

11. The socket according to claim 7, wherein each of the biting features of the locking ring defines a sharp point.

12. The socket according to claim 11, wherein each biting feature defines a discontinuous structure along an internal circumference of the locking ring.

13. The socket according to claim 11, wherein each biting feature defines one or more chamfered edges.

14. A connection socket for a tubular connection, consisting of:
a socket cup comprising a metal alloy composition and a sealing portion;
a primary seal positioned within the sealing portion, the primary seal comprising an elastomeric material;
one spacer ring positioned within the sealing portion; and
a locking ring positioned within the sealing portion and comprising a metal alloy composition,
wherein the one spacer ring is between the locking ring and the primary seal,
wherein the locking ring comprises multiple biting features,
wherein the locking ring aids in gripping a pipe under high temperature exposure of the pipe and connection socket, and
further wherein the one spacer ring comprises a metal alloy composition with a coefficient of thermal expansion (CTE) that is greater than the CTE of the metal alloy composition of the socket cup, and wherein the one spacer ring aids in sealing the pipe under high temperature exposure of the pipe and the connection socket.

15. The socket according to claim 14, wherein the metal alloy composition of the locking ring is a stainless steel.

16. The socket according to claim 15, wherein the metal alloy composition of the socket cup is a carbon steel.

17. The socket according to claim 16, wherein the metal alloy composition of the spacer ring is a stainless steel or a brass.

18. The socket according to claim 14, wherein each of the biting features of the locking ring defines a sharp point.

19. The socket according to claim 18, wherein each biting feature defines a discontinuous structure along an internal circumference of the locking ring.

20. The socket according to claim 18, wherein each biting feature defines one or more chamfered edges.

* * * * *